Figure 1:
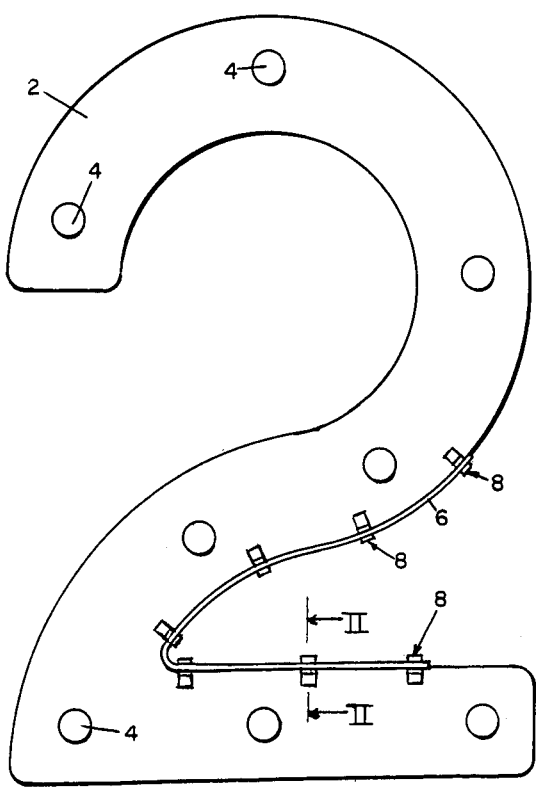

United States Patent [19]

Appelson

[11] Patent Number: 4,622,746
[45] Date of Patent: Nov. 18, 1986

[54] GUIDE FOR DECORATIVE GRASS CUTTING

[76] Inventor: Jay M. Appelson, 2211 W. 71st St., Prairie Village, Kans. 66208

[21] Appl. No.: 747,781

[22] Filed: Jun. 24, 1985

[51] Int. Cl.$^4$ .............................................. E04H 17/00
[52] U.S. Cl. .......................................... 30/286; 47/33
[58] Field of Search ............... 47/33, 32; 33/564, 565; 30/286, 293

[56] References Cited

U.S. PATENT DOCUMENTS

| | | | |
|---|---|---|---|
| 2,662,342 | 12/1953 | Peterson | 47/33 |
| 2,842,344 | 7/1958 | Todd | 47/33 |
| 2,920,388 | 1/1960 | Herndon | 30/293 |
| 3,315,752 | 4/1967 | Pasquini | 47/33 |
| 3,378,949 | 4/1968 | Dorris | 47/33 |
| 3,559,338 | 2/1971 | Klingberg | 47/33 |
| 4,349,596 | 9/1982 | Hendrix | 47/33 |
| 4,508,319 | 4/1985 | Tappan | 47/33 |

Primary Examiner—Jimmy C. Peters
Attorney, Agent, or Firm—John A. Hamilton

[57] ABSTRACT

A guide facilitating the formation of decorative patterns in the grass of lawns delineated by grass cut at different elevations, and constituting a planar template cut to the contour of a desired pattern and adapted to be laid on the ground, a guide strip of flexible sheet material adapted to be laid along an edge of the template with its plane disposed vertically, and support members attached to the guide strip at intervals along its length, and also to an edge of the template. The support members may be anchored relative to the ground either by spikes drivable into the ground, or by weights placed on the template.

7 Claims, 5 Drawing Figures

U.S. Patent  Nov. 18, 1986  4,622,746

GUIDE FOR DECORATIVE GRASS CUTTING

This invention relates to new and useful improvements in lawn care equipment, and has particular reference to a device facilitating the cutting of grass in decorative and novel patterns delineated by grass of different heights. For example, the name or street address of a homeowner may be indicated on the lawn by allowing grass within areas forming the desired numerals or letters to grow to a higher elevation, while cutting the surrounding grass to a lower elevation. Using this technique, many other decorative forms could be delineated, or the grass could be shaped in random free-form "sculptures". So far as is within my knowledge, this is a new technique, and no equipment for performing it has been devised, and the provision of such equipment is the overall object of the present invention.

Accordingly, an object of the present invention is the provision of a lawn cutting guide comprising an elongated planar guide strip adapted to be laid along the ground surface with its transverse dimension arranged vertically to the ground, and a series of support members attached to said guide strip at intervals along its length, and adapted to rest on or be inserted into the ground to support the guide strip with its transverse dimension arranged vertically. The grass may then be cut accurately up to one side of the guide strip, for example by a rotary flail cutter of a type commonly sold commercially under such proprietary names as WEED EATER, while leaving the grass at the opposite side of the guide strip uncut.

Another object is the provision of a device of the character described in which the guide strip is resiliently flexible whereby it may be flexed horizontally to follow the contour of a numeral, letter, or other character or design, and in which the support members are freely adjustable along the guide strip, so as to be disposable at points thereof allowing them to maintain the strip in the desired horizontal contour.

A further object is the provision of a device of the character described including a planar template, which may conform to the shape of a desired letter, numeral or other character, adapted to be laid on the lawn in the desired position, and anchored relative to the ground by stones or other weights laid thereon. Each of the support members is also provided with means for attaching it to the edge of said template. With characters of the size often desired for marking lawns, it would not be practical to provide guide strips sufficiently long to encircle the entire character, and the anchored template permits the periphery to be cut one section at a time, and the guide strip moved along the template edge after cutting each section.

Other objects are simplicity and economy of construction, and efficiency and dependability of operation.

Figures 2, 3, 4, 5:
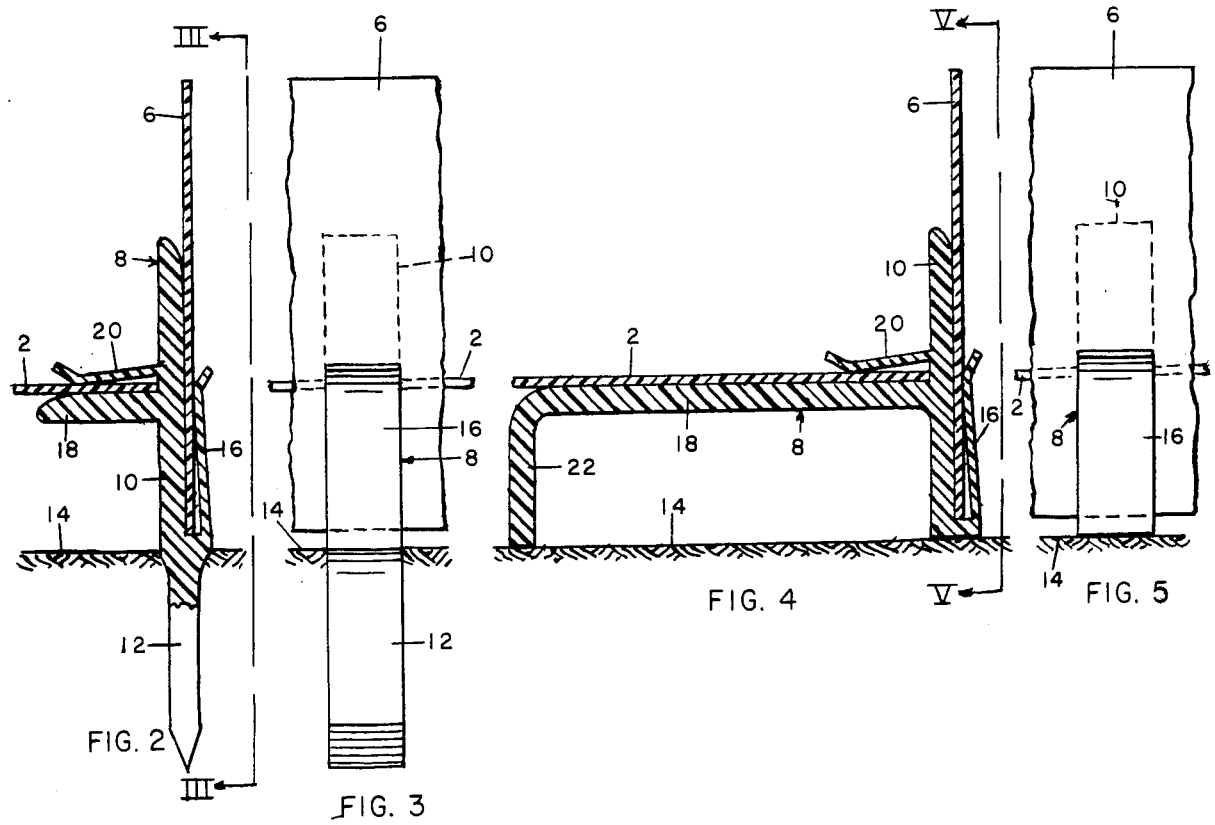

With these objects in view, as well as other objects which will appear in the course of the specification, reference will be had to the accompanying drawing, wherein:

FIG. 1 is a plan view of a grass cutting guide embodying the present invention, arranged for use thereof, FIG. 2 is an enlarged, fragmentary sectional view taken on line II—II of FIG. 1, FIG. 3 is a fragmentary view taken in the direction of line III—III of FIG. 2, FIG. 4 is a view similar to FIG. 2, but showing a modification of structure, and FIG. 5 is a fragmentary view taken in the direction of line V—V of FIG. 4.

Like reference numerals apply to similar parts throughout the several views, and the numeral 2 applies to a template, shaped by way of example in the form of the numeral 2, and formed of sheet material such as sheet plastic, adapted to be laid on a lawn in the position desired, and anchored in place by weights 4, which could for example be small stones, laid on the top surface thereof. Preferably, the sheet material of which the template is formed is sufficiently flexible that the template may be rolled for storage in a relatively small space when not in use.

A guide strip 6, also formed of a resiliently flexible material such as sheet plastic, and being for example about three inches wide and three feet long, is adapted to be arranged along an edge of template 2, with its transverse dimension disposed vertically, and with its lower edge disposed substantially at ground level. The template preferably should be rounded at any corners thereof to a radius no less than that to which the guide strip itself may be flexed without damage. The guide strip is supported in the desired attitude and position by a series of support members arranged in spaced relation along its length and each indicated generally by the numeral 8. One form of this support member 8 is detailed in FIGS. 2 and 3, and another in FIGS. 4 and 5.

In FIGS. 2 and 3, it will be seen that the support member 8 consists of an upright finger 10 having at its bottom end a longitudinally extending spike 12 which may be pressed into the ground as shown, the ground level being indicated at 14. The entire support member is formed of a plastic material sufficiently flexible as to be resiliently yieldable in thin sections, and is of one-piece unitary form. Guide strip 6 lies against the outer surface of finger 10, and is urged clampingly thereagainst by a spring leaf 16 integrally joined with the finger at its lower end and extending upwardly. The surface of the finger against which the guide strip is clamped may be termed its outer surface. Extending from its opposite, or inner, surface, is a short, horizontal arm 18, spaced somewhat above ground level. An edge of template 2 is supported on arm 18, and urged clampingly thereagainst by a spring leaf 20 integral with and extending inwardly from finger 10. The support member 8 shown in FIGS. 4 and 5 is generally similar to that shown in FIGS. 2 and 3, similar parts being indicated by the same numerals, except that inwardly extending arm 18 is not short, but extends inwardly a substantially greater distance, and is provided at its inner end with a depending leg 22, which also rests at its lower end on the ground by gravity.

In the use of the device utilizing the support members 8 shown in FIGS. 2 and 3, template 2 is first laid on the grass in a desired position, and anchored by weights 4. Guide strip 6 is then arranged along the peripheral edge of the template, extending as far around the template as its length permits, and support members 8 are distributed along the length of the guide strip. Each support member is anchored in the ground by pressing its spike 12 into the ground, is attached to guide strip 6 by means of its leaf spring 16, and attached to template 2 by means of its leaf spring 20. Using a flail type grass cutter as previously described, the grass may then be cut accurately to the outer side of the guide strip, while the grass inside of the strip and under template 2 will of course not be cut. The guide strip should be sufficiently strong and support members 8 sufficiently closely spaced that the strip will not be appreciably deflected by horizontal forces exerted thereagainst by the cutter flails. The support members 8 should be spaced strategically along the guide strip so that said strip will follow the contour of the template smoothly, for example at both sides of any sharp curve of the template, and any reversals of curvature thereof. The support members are freely adjustable along the guide strip for this purpose. This process is repeated, moving the guide strip successively in steps around the periphery of the template, until the grass has been cut around the entire periphery. The process is then repeated, using other properly placed templates, until an entire street address, name or the like is completely spelled out across a lawn. After the guide elements have been removed, the uncut grass which previously lay beneath the templates can be trimmed, preferably to a substantially higher elevation, by any other suitable type of lawnmower, in order to provide a smoother and neater overall appearance. The remainder of the lawn, forming the background for the design, is usually mowed to the lower elevation of the grass immediately adjacent the numerals, letters, etc. The novel lawn appearance thus created is quite dramatic, startling and intriguing to those viewing the lawn.

Use of the device with the support members 8 of FIGS. 4 and 5, is generally the same as described above, except of course that these members have no spikes 12. Spikes of course form holes in the ground, which are sometimes considered to be objectionable. The lack of spikes of course reduces the strength and stability with which support fingers 10 are fixed in place. The wide separation of fingers 10 from legs 22 supplies greater stability. Also, while the lower end of finger 10 and leg 22 engage the ground among the blades of grass, which tend to prevent the support member from moving along the ground surface, greater reliance for this purpose must be made on template 2. The template of course rests on arms 18, and may be pressed more firmly thereagainst by weights 4, or other weights not shown, and the friction thus supplied, together with the clamping grip of leaf springs 20 on the template edge portion, is effective to prevent movement of the support members along the ground by any forces normally applied thereto.

It is of course not always necessary or desirable to use a template 2. For example, when it is desired to form a free-hand or other spontaneously original design, or to accomodate a design to a characteristic or any given lawn, such templates would not normally be readily available. For this type of work, the support member shown in FIG. 2 is preferred, since having spikes 12 they do not rely in any way on the template to provide positioning support for the guide strip, while the support members of FIG. 4 must rely at least to some extent on the template to hold the guide strip accurately and reliably in a desired contour.

The entire device is not only simple and effective for its intended usage, but also quite economical. Both the template 2 and the guide strip 6 may easily be cut from readily available stock material, and the support members 8 may be formed economically by extruding an appropriate material in the cross-sectional contour shown in either FIG. 2 or FIG. 4, and cutting the extruded form transversely into short lengths.

While I have shown and described certain specific embodiments of my invention, it will be readily obvious that certain minor changes of structure and operation could be made without departing from the spirit of the invention.

What I claim as new and desire to protect by Letters Patent is:

1. A grass cutting guide facilitating the formation of decorative patterns in lawn grass delineated by grass cut to relatively different elevations, said guide comprising:
   a. a planar template formed of flexible sheet material, having the form of a desired pattern and adapted to be laid on the grass in a desired location,
   b. an elongated guide strip of sheet form adapted to be arranged along the ground surface at the edge of said template with its transverse axis extending vertically upwardly from the ground,
   c. a series of support members attached to said guide strip at intervals along its length,
   d. means operable to secure each of said support members releasably to and edge of said template, and
   e. anchoring means operable to secure said support members against horizontal movement over the ground, whereby grass may be cut to one side of the guide strip, while cutting of grass at the other side of said guide strip is prevented by said strip.

2. A grass cutting guide as recited in claim 1 wherein said guide strip is formed of resiliently flexible material, whereby it may be horizontally conformed to curving or irregular contours of the template.

3. A grass cutting guide as recited in claim 2 wherein said support members are freely adjustable along the length of said guide strip, and said template whereby to be positionable at the points thereof required to constrain it to follow said curved or irregular contours smoothly.

4. A grass cutting guide as recited in claim 1 wherein said anchoring means comprises a rigid spike affixed to the lower end of each of said support members and adapted to be driven into the ground.

5. A grass cutting guide as recited in claim 1 wherein each of said support members comprises:
   a. a straight finger having a generally coaxially extending spike at one end thereof, and operable to be supported in a generally vertical upright position when said spike is driven into the ground, said guide strip lying against one side of said finger, whereby said finger supports said guide strip against horizontal lateral deflection in one direction, and
   b. a spring clip forming a part of said finger and operable to clamp said guide strip frictionally against said finger.

6. A grass cutting guide as recited in claim 1 wherein each of said support members includes an arm projecting horizontally therefrom beneath said template, in spaced relation above ground level, and wherein said securing means comprises a spring clip carried by each of said support members and operable to press said template frictionally against said arm.

7. A grass cutting guide as recited in claim 1 wherein said support members rest freely on the ground and carry a pair of spring clips, the first of which is operable to secure said guide strip frictionally to said support member, and the second of which is operable to secure said template frictionally to said support member, and with the addition of weights laid on said template to resist movement thereof over the ground, said weights and the second of said spring clips constituting said anchoring means.

* * * * *